United States Patent
Rennie et al.

(10) Patent No.: US 9,524,841 B2
(45) Date of Patent: Dec. 20, 2016

(54) HEAT DETECTOR WITH SHAPE METAL ALLOY ELEMENT

(71) Applicant: Kidde Technologies, Inc., Wilson, NC (US)

(72) Inventors: Paul Rennie, Bracknell (GB); Beth A. Dutson, Hook (GB); Paul D. Smith, Camberley (GB); Robert G. Dunster, Slough (GB)

(73) Assignee: Kidde Technologies, Inc., Wilson, NC (US)

( * ) Notice: Subject to any disclaimer, the term of this patent is extended or adjusted under 35 U.S.C. 154(b) by 448 days.

(21) Appl. No.: 14/137,138

(22) Filed: Dec. 20, 2013

(65) Prior Publication Data

US 2014/0177675 A1    Jun. 26, 2014

(30) Foreign Application Priority Data

Dec. 21, 2012    (GB) .................................. 1223285.6

(51) Int. Cl.
    *H01H 37/32*    (2006.01)
    *H01H 61/01*    (2006.01)
    *G01K 5/48*     (2006.01)

(52) U.S. Cl.
    CPC .......... *H01H 61/0107* (2013.01); *G01K 5/483* (2013.01)

(58) Field of Classification Search
    CPC ......... G01K 5/56; G01K 5/483; H01H 37/323
    USPC ................................................. 374/188, 204
    See application file for complete search history.

(56) References Cited

U.S. PATENT DOCUMENTS

| | | | |
|---|---|---|---|
| 3,177,479 A * | 4/1965 | Lindberg | G08B 17/06 340/515 |
| 4,362,057 A | 12/1982 | Gottlieb et al. | |
| 5,024,497 A | 6/1991 | Jebens | |
| 5,745,611 A | 4/1998 | Komachiya et al. | |
| 6,266,461 B1 | 7/2001 | Takahashi | |
| 6,367,250 B1 | 4/2002 | Baumbick | |
| 7,170,590 B2 | 1/2007 | Kishida | |
| 7,578,617 B2 * | 8/2009 | Zhang | G01K 3/005 374/178 |
| 7,719,666 B2 | 5/2010 | Kishida et al. | |
| 7,992,440 B2 | 8/2011 | Kumagai et al. | |
| 8,220,259 B1 | 7/2012 | Cripe et al. | |
| 8,285,086 B2 | 10/2012 | Nishikawa et al. | |

FOREIGN PATENT DOCUMENTS

| | | |
|---|---|---|
| CN | 2773649 Y * | 4/2006 |
| DE | 1952475 A1 | 1/1997 |
| EP | 0515024 A2 | 11/1992 |

(Continued)

OTHER PUBLICATIONS

Extended European Search Report from EP Application Serial No. 13199208.3; dated Mar. 19, 2014, 5 pages.

*Primary Examiner* — Minh Phan
*Assistant Examiner* — Leon W Rhodes
(74) *Attorney, Agent, or Firm* — Kinney & Lange, P.A.

(57) ABSTRACT

A temperature sensing system comprises a conductive tube, a shape memory alloy (SMA) element, and a detector. The SMA element is disposed to create an electrical contact with the electrical tube when subjected to at least a critical temperature, and the detector is configured to identify an alarm condition when the conductive tube and the SMA element form a closed electrical circuit.

15 Claims, 3 Drawing Sheets

(56) References Cited

FOREIGN PATENT DOCUMENTS

| | | | | | |
|---|---|---|---|---|---|
| FR | 2927994 | A1 | * | 8/2009 | ............ G01K 5/483 |
| JP | 02190723 | A | * | 7/1990 | |
| JP | 08096630 | A | * | 4/1996 | |
| JP | 3344366 | B2 | | 11/2002 | |
| JP | 2006317987 | A | * | 11/2006 | |

* cited by examiner

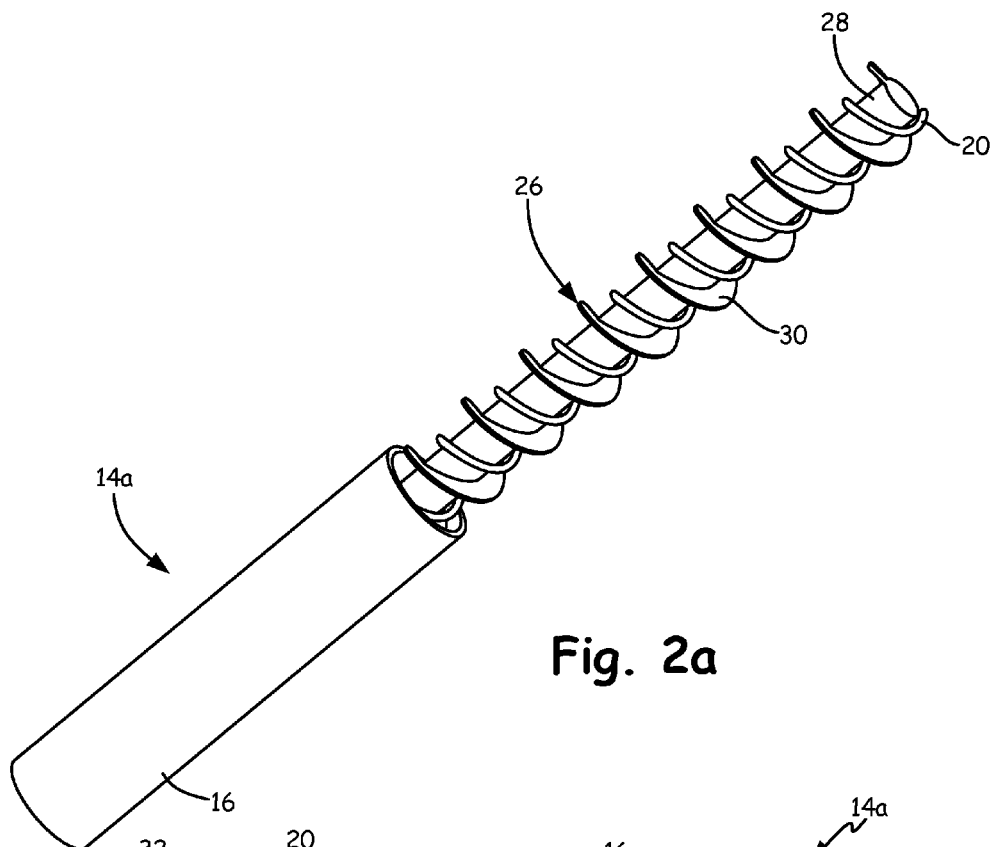
Fig. 2a
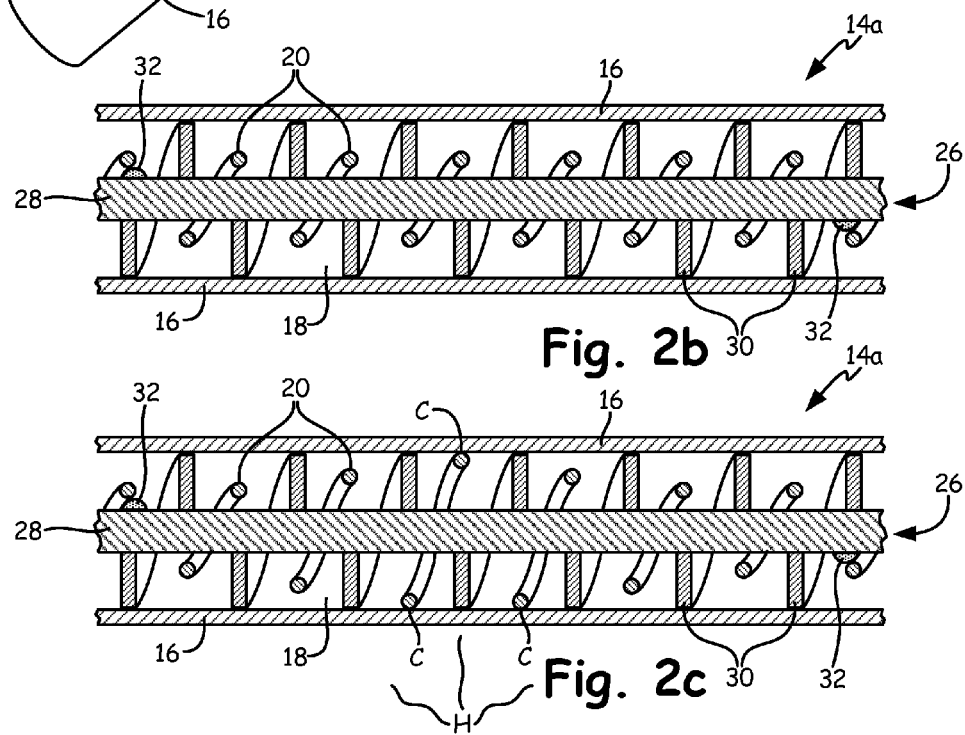
Fig. 2b
Fig. 2c

HEAT DETECTOR WITH SHAPE METAL ALLOY ELEMENT

CROSS-REFERENCE TO RELATED APPLICATION

This application claims priority to foreign patent application GB 1223285.6, filed Dec. 21, 2012 in the United Kingdom, which is hereby incorporated by reference in its entirety.

BACKGROUND

The present invention relates generally to temperature sensing, and more particularly to linear sensing elements for localized overheat detection.

A variety of linear systems exist to sense temperatures and temperature changes for fire and overheat detection in a wide range of applications, including industrial and aerospace applications. Linear systems use elongated sensing elements that extend from a logic-capable detector into one or more sensing regions. Although some systems use a separate detector for each sensing element, many systems join a plurality of sensing elements to single detector. Detectors sense temperature along the sensing elements, and compare temperatures and rates of temperature change with preselected or computed thresholds to flag overheat conditions. Detectors that sense overheat temperatures above a designated threshold may trigger an alarm in a variety of ways, such as by signaling a central control or monitoring system, activating lights or alarms, or storing an alarm event in a maintenance log.

Examples of digital linear detectors include digital alarmline, salt detectors, and pneumatic detectors, each with associated advantages and disadvantages. Digital alarmline use twisted pairs of conductors separated by a polymer insulator that softens or melts when subjected to temperatures above a threshold, allowing adjacent conductors to electrically contact one another. Digital alarmline is simple and inexpensive, but cannot reset, and must be replaced after each alarm. Salt detectors utilize eutectic inorganic salts as variable impedance elements that come into conduction to close an electrical contact when exposed to high temperatures. Salt detectors must be continuously AC powered during operation to avoid polarization effects. Some examples of pneumatic detectors use gases that are evolved from a solid core when heated, producing an increase in fluid pressure within the sensing element that is detected with a diaphragm switch or other pressure sensor. The evolved gas is only partially reabsorbed when the solid core of a pneumatic detector cools, causing a gradual decrease in detector sensitivity.

In addition to identifying overheat conditions corresponding to localized hot spots at temperatures greater than a local alarm threshold $T_{local}$, some temperature sensing systems are required to throw alarms for distributed overheat conditions corresponding to a high average temperature $T_{distributed} < T_{local}$ across a wide region. Various analog sensors, including pressure sensors and optical fiber sensors, are commonly used to sense distributed temperatures.

SUMMARY

The present invention is directed toward a temperature sensing system comprising a conductive tube, a shape memory alloy (SMA) element, and a detector. The SMA element is disposed to create an electrical contact with the electrical tube when subjected to at least a critical temperature, and the detector is configured to identify an alarm condition when the conductive tube and the SMA element form a closed electrical circuit.

BRIEF DESCRIPTION OF THE DRAWINGS

FIG. 2a is a simplified cutaway view of a first embodiment of a sensing element of the sensing system of FIG. 1.

FIG. 2b is a cross-sectional view of the sensing element of FIG. 2a in an unstrained state.

FIG. 2c is a cross-sectional view of the sensing element of FIG. 2a in a strained state.

DETAILED DESCRIPTION

Figure 1:
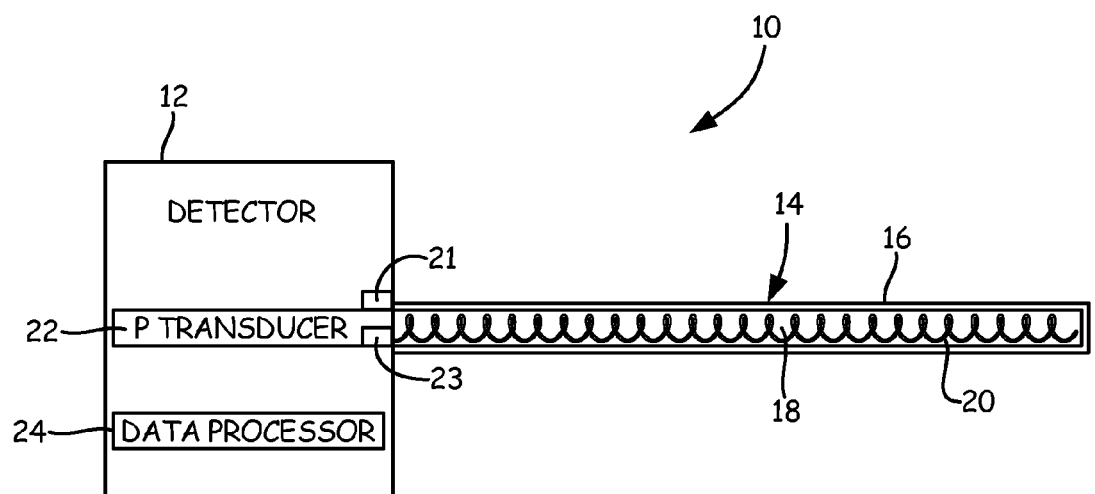
FIG. 1 is a schematic block diagram of a sensing system according to the present invention.

FIG. 1 is a schematic block diagram of sensing system 10, comprising detector 12 and sensing element 14. As shown, detector 12 is a hybrid digital/analog detector capable of identifying both distributed and local overheat conditions along sensing element 14. Sensing element 14 is an elongated linear sensing element that extends from detector 12 to at least one sensing location. Sensing element 14 may be a tubular element, or a flexible or semi-flexible element capable of limited bending. Although detector 12 is shown with only one sensing element 14, alternative embodiments of detector 12 may include a plurality of parallel sensing elements 14 extending to the same or different sensing regions. Detector 12 may collectively or separately monitor overheat conditions for each sensing element 14, and may detect overheat conditions with each sensing element 14 separately, or as a function of sensor readings from multiple sensing elements.

Detector 12 includes electrical contacts 21 and 23, pressure transducer 22, and data processor 24. Sensing element 14 comprises conductive tube 16, inner fill 18, and shape memory alloy (SMA) element 20. Conductive tube 16 is an elongated cylinder of conductive material that surrounds SMA element 20. SMA element 20 is a conductive spring, coil, or helix that expands radially to form an electrical contact with conductive tube 16 at a critical temperature $T_{crit}$, as described below with respect to FIGS. 2a-2c and 3a-3c. Conductive tube 16 and sensing element 14 cooperate with electrical contacts 21 and 23, respectively, to form an electrical circuit that is closed only when SMA element 20 expands into contact with conductive tube 16. Data processor 24 is a microprocessor, logic board, or similar logic-capable device configured to detect a closed circuit between electrical contacts 21 and 23, and flag a local overheat condition when this occurs. In some embodiments, data processor 24 may also receive a pressure signal from pressure transducer 22, a transducer disposed against the interior of sensing element 14. In these embodiments, sensing element 14 contains inner fill 18, an inert gas fill that thermally expands against pressure transducer 22 when heated, thereby providing an indication of distributed temperature across the entirety of sensing element 14. Pressure transducer 22 may, for instance, be a diaphragm switch selected to close at pressures corresponding to a distributed overheat temperature $T_{Dist}$. Alternatively, pressure transducer 22 may comprise a strain gauge or an electromagnetic diaphragm displacement sensor configured to produce a continuous measurement of pressure, and accordingly temperature, within conductive tube 16.

During ordinary operation, SMA element 20 does not contact conductive tube 16, leaving an open electrical switch between electrical contacts 21 and 23. When a portion of SMA element 20 is heated to critical temperature $T_{crit}$, that portion of SMA element 20 expands locally to form an electrical contact with conductive tube 16, as described in greater detail with respect to FIGS. 2a-c and 3a-c. Upon cooling, SMA element 20 is drawn or forced back to its original position, as described below with respect to FIGS. 2b, 2c, 3b, and 3c, resetting the switch. Because a sufficiently high temperature ($>T_{crit}$) anywhere along sensing element 16 will close the electrical switch between electrical contacts 21 and 23, this switch acts as a threshold detector for local overheat conditions, even overheat conditions confined to a small area near sensing element 14. Pressure transducer 22 may be included to simultaneously monitor average or distributed temperature across the entirety of sensing element 14. Some embodiments of data processor 24 may identify an overheat condition only when both sensing mechanisms indicate an alarm—i.e. when the electrical switch between electrical contacts 21 and 23 is closed and pressure transducer 22 indicates a distributed overheat condition. In other embodiments, data processor 24 may differentiate between and separately identify distributed and local overheat conditions.

Detector 12 may further comprise or communicate with a range of peripheral communication or storage elements, including transceivers for transmitting alarm signals or monitored temperature readings to a remote control or monitoring device, speakers or lights for indicating an alarm condition, and/or memory for storing sensed temperatures or alarm logs.

FIGS. 2a, 2b, and 2c depict sensing element 14a, a first embodiment of sensing element 14 comprising conductive tube 16, inner fill 18, SMA element 20, support structure 26 (with core 28 and spacer 30), and adhesives 32. FIG. 2a is cut-away view of sensing element 14a in which conductive tube 16 is shown stripped away from a portion of sensing element 14a to expose SMA element 20 and support structure 26. FIG. 2b is a cross-sectional view of sensing element 14a in a first, unstrained state corresponding to temperatures $T<T_{crit}$. FIG. 2c is a cross-sectional view of sensing element 14a in a second, strained state wherein several turns of SMA element 20 are exposed to temperatures $T>T_{crit}$. In some embodiments, conductive tube 16, SMA element 20, core 28, and spacer 30 may all be flexible or semi-flexible components capable of at least some bending to allow sensing element 14a to pass into and through a sensing region.

As discussed above with respect to FIG. 1, detector 12 identifies local overheat conditions along sensing element 14 by sensing when SMA element 20 contacts conductive tube 16, thereby closing an electrical switch between electrical contacts 21 and 23. Sensing element 14a uses support structure 26 to hold SMA element 20 apart from conductive tube 16 at temperatures $T<T_{crit}$. SMA element 20 is coiled about core 28, a non-conductive structural core that extends coaxially with and inside conductive tube 16. Spacer 30 is a helical or screw-shaped non-conductive spacer that wraps around core 28, and spaces core 28 apart from conductive tube 16. Adhesives 32 are adhesive patches or beads that adhere SMA element 20 to core 28 at locations on either end of the sensing region.

SMA element 20 and spacer 30 wrap helically about core 28. Spacer 30 positions core 28 centrally within conductive tube 16, providing clearance between SMA element 20 and conductive tube 16. At temperatures $T<T_{crit}$, core 28 restrains SMA element 20, preventing SMA element 20 from contacting conductive tube 16. At temperature $T>T_{crit}$, SMA element 20 deforms about core 28, expanding to touch conductive tube 16 at contact points C and close the electrical switch between electrical contacts 21 and 23, as described above with respect to FIG. 1. As temperatures drop from $T>T_{crit}$ to $T<T_{crit}$, spring tension across SMA element 20 between adhesives 32 draws SMA element back to its unexpanded state (FIG. 2b). SMA element 20 is formed of a material selected to have a critical temperature $T_{crit}$ corresponding to a local overheat alarm threshold temperature. In particular, SMA element 20 may, for instance, be formed of a Nickel-Titanium alloy with a Nickel/Titanium ratio selected as known in the art to produce an appropriate critical temperature $T_{crit}$. In alternative embodiments, SMA element 20 may be formed of Copper or Iron based alloys, or be at least partially formed of Vanadium, Chromium, Manganese, Cobalt, Iron, Aluminum, Palladium, Zinc, Tin, Nickel or Gold. Because SMA element 20 experiences a discrete phase change at critical temperature $T_{crit}$, the geometry of SMA element 20 remains substantially unchanged in $T<T_{crit}$ and $T>T_{crit}$ temperature regions, changing significantly only in the phase transition at $T=T_{crit}$. The selection of material for SMA element 20 thus determines the local overheat sensing threshold of sensing element 14a. As discussed above with respect to FIG. 1, some embodiments of sensing element 14a may contain inner fill 18. Inner fill 18 is an inert gas such as Helium that is free to flow throughout the interior of conductive tube 16. Pressure transducer 22 detects thermal expansion of inner fill 18, which data processor 24 correlates with distributed temperature across sensing element 14.

Figure 3A:
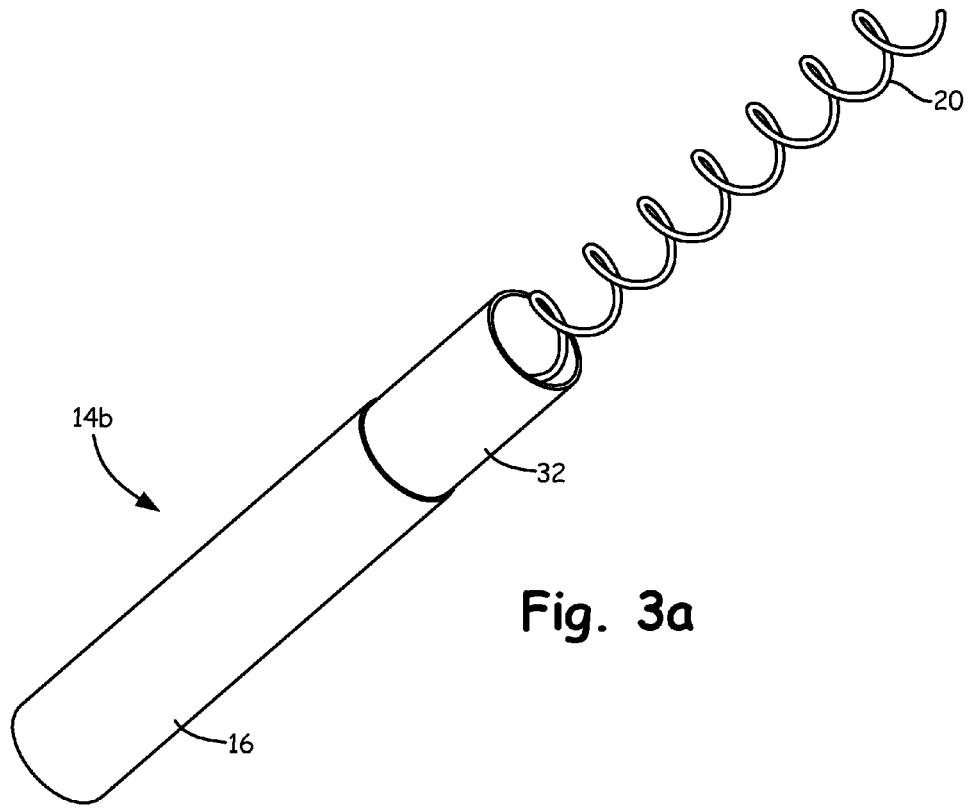
FIG. 3a is a simplified cutaway view of a second embodiment of a sensing element of the sensing system of FIG. 1.
Figure 3B:
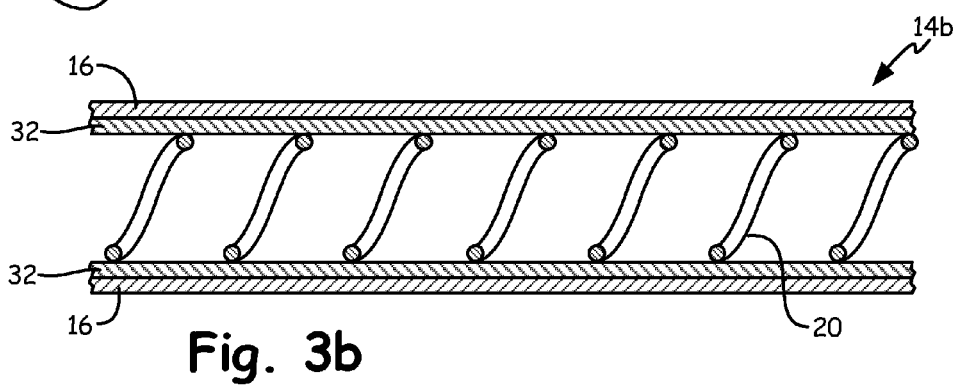
FIG. 3b is a cross-sectional view of the sensing element of FIG. 3a in an unstrained state.
Figure 3C:
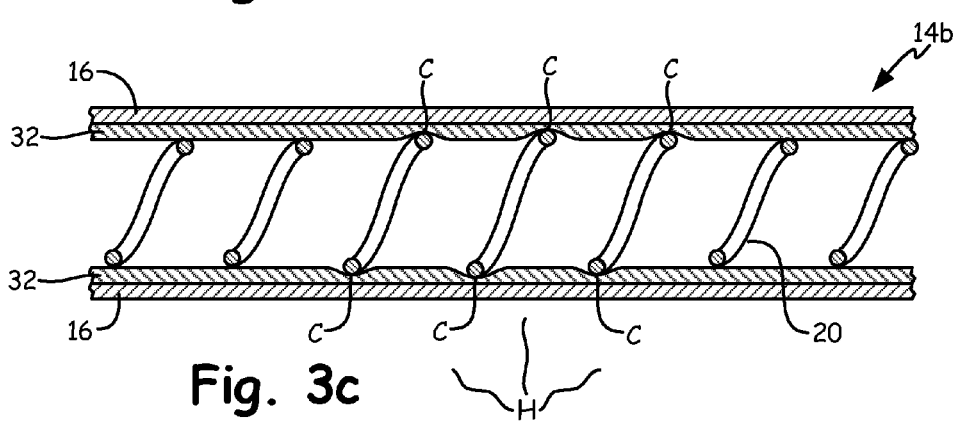
FIG. 3c is a cross-sectional view of the sensing element of FIG. 3a in a strained state.

FIGS. 3a, 3b, and 3c depict sensing element 14b, a second embodiment of sensing element 14 comprising conductive tube, inner fill 18, SMA element 20, and piezoresistive sleeve 32. FIG. 3a is a cut-away view of sensing element 14b in which conductive tube 16 is shown stripped away from a portion of sensing element 14b to expose piezoresistive sleeve 32, and piezoresistive sleeve 32 is shown stripped away from a portion of sensing element 14b to expose SMA element 20. FIG. 3b is a cross-sectional view of sensing element 14b in a first, unstrained state corresponding to temperatures $T<T_{crit}$. FIG. 3c is a cross-sectional view of sensing element 14b in a second, strained state wherein several turns of SMA element 20 are exposed to temperatures $T>T_{crit}$. As described above with respect to FIGS. 2a, 2b, and 2c, all components of sensing element 14b may be flexible or semi-flexible to allow sensing element 14b to pass into and through a sensing region.

FIGS. 3a, 3b, and 3c differ from FIGS. 2a, 2b, and 2c, respectively, only in the replacement of support structure 26 with piezoresistive sleeve 32. Piezoresistive sleeve 32 is a compressible tube disposed concentrically inside conductive tube 16. Piezoresistive sleeve 32 abuts conductive tube 16, and has electrical permittivity that varies as a function of pressure or strain. Piezoresistive sleeve 32 may, for instance, be formed of a rigid ceramic material or a flexible piezoelectric polymer membrane.

SMA element 20 rests within piezoresistive sleeve 32, and may or may not contact the entire circumference of piezoresistive sleeve 32 at temperatures $T<T_{crit}$. As localized hot spots cause SMA element 20 heat and deform in particular locations, however, SMA element 20 presses against and strains piezoresistive sleeve 32 at contact points C, causing piezoresistive sleeve 32 to become electrically conductive at contact points C and closing the electrical switch between conductive tube 16 and SMA element 20, and accordingly between electrical contacts 21 and 23. As temperatures drop from $T>T_{crit}$ to $T<T_{crit}$, piezoresistive sleeve 32 forces SMA element 20 back into its unexpanded state (FIG. 3b). Although the mechanics of sensing element 14b differ somewhat from those of sensing element 14a, the underlying operating principle is the same: expansion of SMA element 20 at $T<T_{crit}$ closes an electrical circuit between SMA element 20 and conductive tube 16, allowing data processor 24 to sense a local overheat condition. In some instances, data processor 24 may determine an approximate location of contact points C along the length of sensing element 14, e.g. from signal time-of-flight or voltage drop between electrical terminals 21 and 23.

While the invention has been described with reference to an exemplary embodiment(s), it will be understood by those skilled in the art that various changes may be made and equivalents may be substituted for elements thereof without departing from the scope of the invention. In particular, although SMA element 20 is described herein as an element situated within conductive tube 16, other embodiments of sensing element 14 may comprise SMA elements 20 disposed concentrically outside of conductive tube 16 or a similar conductive element so as to directly expose SMA element 20 to the surrounding environment for increased temperature sensitivity. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A temperature sensing system comprising:
   a conductive tube;
   a shape memory alloy (SMA) element disposed to create an electrical connection with the conductive tube when subjected to at least a critical temperature; and
   a detector configured to identify an alarm condition when the conductive tube and the SMA element form a closed electrical circuit; and
   a piezoresistive sleeve disposed between the SMA element and the conductive tube, and configured to act as a conductor when strained by a shape change of the SMA element.

2. The temperature sensing system of claim 1, wherein the SMA element is disposed within the conductive tube.

3. The temperature sensing system of claim 1, further comprising:
   a volume of gas enclosed within the conductive tube; and
   a pressure transducer configured to sense thermal expansion of the volume of inert gas, and thereby sense distributed temperature along the conductive tube.

4. The temperature sensing system of claim 3, wherein the pressure transducer is a diaphragm switch selected to close at a distributed overheat temperature.

5. The temperature sensing system of claim 3, wherein the pressure transducer is a continuous pressure sensor.

6. The temperature sensing system of claim 1, further comprising:
   a support structure configured to retain the SMA element at a separation distance from the conductive tube when below the critical temperature.

7. The temperature sensing system of claim 6, wherein the support structure comprises:
   a core disposed concentrically within the conductive tube to support the SMA element; and
   a spacer extending between the core and the concentric tube to distance the core and the SMA element from the conductive tube.

8. The temperature sensing system of claim 7, wherein the SMA element is a helix or spring disposed about the core.

9. The temperature sensing system of claim 7, wherein the spacer is a helix or spring disposed between the core and the conductive tube.

10. The temperature sensing system of claim 7, wherein the SMA element is adhered to the core in at least two locations.

11. The temperature sensing system of claim 1, wherein the piezoresistive sleeve is a flexible membrane that is deformed by a shape change of the SMA element.

12. The temperature sensing system of claim 1, wherein the SMA element is a helix or spring disposed that radially expands to compress the piezoresistive sleeve at temperatures above the critical temperature.

13. The temperature sensing system of claim 1, wherein the detector further comprises a data processor configured to flag an alarm condition whenever the SMA element forms a closed circuit with the conductive tube.

14. The temperature sensing system of claim 1, wherein the detector connects to and identifies alarm conditions from a plurality of conductive tubes and a plurality of corresponding SMA elements.

15. The temperature sensing system of claim 1, wherein the SMA element is formed of a Nickel-Titanium alloy.

* * * * *